United States Patent
Hegde et al.

(10) Patent No.: US 11,403,523 B2
(45) Date of Patent: Aug. 2, 2022

(54) SPARSITY CONSTRAINTS AND KNOWLEDGE DISTILLATION BASED LEARNING OF SPARSER AND COMPRESSED NEURAL NETWORKS

(71) Applicant: Tata Consultancy Services Limited, Mumbai (IN)

(72) Inventors: Srinidhi Hegde, Gurgaon (IN); Ramya Hebbalaguppe, Gurgaon (IN); Ranjitha Prasad, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 584 days.

(21) Appl. No.: 16/562,758

(22) Filed: Sep. 6, 2019

(65) Prior Publication Data

US 2020/0387782 A1 Dec. 10, 2020

(30) Foreign Application Priority Data

Jun. 7, 2019 (IN) .............................. 201921022724

(51) Int. Cl.
*G06K 9/00* (2022.01)
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC .......... G06N 3/08; G06N 3/0454; G06N 3/04; G06N 3/063
USPC ......................................................... 706/19
See application file for complete search history.

(56) References Cited

U.S. PATENT DOCUMENTS

| | | | | |
|---|---|---|---|---|
| 10,019,470 | B2 * | 7/2018 | Birdwell | G06N 3/0635 |
| 10,832,139 | B2 * | 11/2020 | Yan | G06T 7/10 |
| 11,137,894 | B1 * | 10/2021 | Chen | G06F 1/1643 |
| 11,138,334 | B1 * | 10/2021 | Garrod | G10L 15/02 |
| 2018/0174053 | A1 * | 6/2018 | Lin | G06N 3/049 |
| 2019/0073581 | A1 * | 3/2019 | Chen | G06Q 30/0251 |
| 2019/0108436 | A1 | 4/2019 | David et al. | |
| 2019/0180176 | A1 * | 6/2019 | Yudanov | G06N 3/08 |

(Continued)

FOREIGN PATENT DOCUMENTS

| | | |
|---|---|---|
| CN | 108921294 | 11/2018 |
| WO | WO-2018/223822 | 12/2018 |

OTHER PUBLICATIONS

Ruder, S. (2017). "An overview of gradient descent optimization algorithms," *arXiv*, retrieved from https://arxiv.org/abs/1609.04747 (14 pages).

(Continued)

*Primary Examiner* — Marceau Milord
(74) *Attorney, Agent, or Firm* — Finnegan, Henderson, Farabow, Garrett & Dunner LLP

(57) ABSTRACT

Implementations of the present disclosure build a Bayesian student network using the knowledge learnt by an accurate but complex pre-trained teacher network, and sparsity induced by the variational parameters in a student network. Further, the sparsity inducing capability of the teacher on the student network is learnt by employing a Block Sparse Regularizer on a concatenated tensor of teacher and student network weights. Specifically, the student network is trained using the variational lower bound based loss function, constrained on the hint from the teacher, and block-sparsity of weights.

18 Claims, 8 Drawing Sheets

(56) References Cited

U.S. PATENT DOCUMENTS

2019/0392323 A1* 12/2019 Yan .................. G06N 3/084
2020/0134461 A1*  4/2020 Chai ................. G06N 3/088

OTHER PUBLICATIONS

Brownlee, J. (2018). "A Gentle Introduction to Early Stopping to Avoid Overtraining Neural Networks," *Machine Learning Mastery*, retrieved from https://machinelearningmastery.com/early-stopping-to-avoid-overtraining-neural-network-models/ (10 pages).
Molchanov, D. et al. (2017). "Variational Dropout Sparsities Deep Neural Networks," *arXiv*, retrieved from https://arxiv.org/abs/1701.05369 (10 pages).
Liu, Y. et al. (2019). "Variational Bayesian Dropout with a Hierarchical Prior," *arXiv*, retrieved from https://arxiv.org/abs/1811.07533 (10 pages).

* cited by examiner

SPARSITY CONSTRAINTS AND KNOWLEDGE DISTILLATION BASED LEARNING OF SPARSER AND COMPRESSED NEURAL NETWORKS

PRIORITY CLAIM

This U.S. patent application claims priority under 35 U.S.C. § 119 to Indian Application No. 201921022724, filed on Jun. 7, 2019. The entire contents of the aforementioned application are incorporated herein by reference.

TECHNICAL FIELD

The disclosure herein generally relates to neural networks, and, more particularly, to sparsity constraints and knowledge distillation based learning of sparser and compressed neural networks.

BACKGROUND

The Cambrian explosion of machine learning applications over the past decade is largely due to deep neural networks (DNN) contributing to dramatic performance improvements in the domains of speech, vision and text. Despite the active interest in deep learning, miniaturization of devices (smartphones, drones, head-mounts etc.) and significant progress in augmented/virtual reality devices, pose constraints on CPU/GPU, memory and battery life, is thus making it harder to deploy these models on resource constrained portable devices. To address these requirements, compressing DNN and accelerating their performance in such constrained environments is considered inevitable to the acceptable criteria.

SUMMARY

Embodiments of the present disclosure present technological improvements as solutions to one or more of the above-mentioned technical problems recognized by the inventors in conventional systems. For example, in one aspect, there is provided a processor implemented method that utilizes sparsity constraints and knowledge distillation for learning sparser and compressed trained neural networks. The method comprises initializing, by one or more hardware processors, a first neural network with a plurality of weights; training, by the one or more hardware processors, the first neural network by iteratively performing: passing through the first neural network, (i) a subset of an input data received corresponding to a specific domain and (ii) ground truth information corresponding to the subset of the input data; dynamically updating, by the one or more hardware processors, the plurality of weights of the first neural network based on a first difference in an output generated by the first neural network and the corresponding ground truth information of the subset of an input data; dynamically updating, by the one or more hardware processors, the plurality of weights of the first network based on a second different (e.g., another difference) in an output generated by (i) the first neural network and (ii) a second neural network for the subset; and applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network; until a final loss function converges a predefined threshold to obtain a trained compressed and sparser neural network.

In an embodiment, the first difference in an output and the corresponding ground truth information of the subset of an input data is estimated using a cross-entropy loss function.

In an embodiment, the second difference in an output generated by (i) the first neural network and (ii) a second neural network for the subset is estimated using a Kullback-Leibler (KL) divergence function.

In an embodiment, the one or more weights to be dropped or retained are determined by solving the final loss function.

In an embodiment, the final loss function is optimized to obtain the trained compressed and sparser neural network comprising the determined one or more weights being less than the plurality of weights in the second neural network, and wherein selection of the first neural network is based on number of parameters in one or more layers in a neural network.

In an embodiment, the second neural network is a pre-trained neural network.

In one aspect, there is provided a processor implemented system that utilizes sparsity constraints and knowledge distillation for learning sparser and compressed trained neural networks. The system comprises: a memory storing instructions; one or more communication interfaces; and one or more hardware processors coupled to the memory via the one or more communication interfaces, wherein the one or more hardware processors are configured by the instructions to: initialize a first neural network with a plurality of weights, wherein the first neural network is comprised in the memory and executed by the one or more hardware processors; train the first neural network by iteratively performing: passing through the first neural network, (i) a subset of an input data received corresponding to a specific domain and (ii) ground truth information corresponding to the subset of the input data; dynamically updating the plurality of weights of the first neural network based on a first difference in an output generated by the first neural network and the corresponding ground truth information of the subset of an input data; dynamically updating the plurality of weights of the first network based on a second different (e.g., another difference) in an output generated by (i) the first neural network and (ii) a second neural network for the subset, wherein the first neural network is comprised in the memory and executed by the one or more hardware processors; and applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network; until a final loss function converges a predefined threshold to obtain a trained compressed and sparser neural network.

In an embodiment, the first difference in an output and the corresponding ground truth information of the subset of an input data is estimated using a cross-entropy loss function.

In an embodiment, the second difference in an output generated by (i) the first neural network and (ii) a second neural network for the subset is estimated using a Kullback-Leibler (KL) divergence function.

In an embodiment, the one or more weights to be dropped or retained are determined by solving the final loss function.

In an embodiment, the final loss function is optimized to obtain the trained compressed and sparser neural network comprising the determined one or more weights being less than the plurality of weights in the second neural network, and wherein selection of the first neural network is based on number of parameters in one or more layers in a neural network.

In an embodiment, the second neural network is a pre-trained neural network.

In yet another aspect, there are provided one or more non-transitory machine readable information storage mediums comprising one or more instructions which when executed by one or more hardware processors cause utilizing sparsity constraints and knowledge distillation for learning sparser and compressed trained neural networks by initializing, by one or more hardware processors, a first neural network with a plurality of weights; training, by the one or more hardware processors, the first neural network by iteratively performing: passing through the first neural network, (i) a subset of an input data received corresponding to a specific domain and (ii) ground truth information corresponding to the subset of the input data; dynamically updating, by the one or more hardware processors, the plurality of weights of the first neural network based on a first difference in an output generated by the first neural network and the corresponding ground truth information of the subset of an input data; dynamically updating, by the one or more hardware processors, the plurality of weights of the first network based on a second different (e.g., another difference) in an output generated by (i) the first neural network and (ii) a second neural network for the subset; and applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network; until a final loss function converges a predefined threshold to obtain a trained compressed and sparser neural network.

In an embodiment, the first difference in an output and the corresponding ground truth information of the subset of an input data is estimated using a cross-entropy loss function.

In an embodiment, the second difference in an output generated by (i) the first neural network and (ii) a second neural network for the subset is estimated using a Kullback-Leibler (KL) divergence function.

In an embodiment, the one or more weights to be dropped or retained are determined by solving the final loss function.

In an embodiment, the final loss function is optimized to obtain the trained compressed and sparser neural network comprising the determined one or more weights being less than the plurality of weights in the second neural network, and wherein selection of the first neural network is based on number of parameters in one or more layers in a neural network.

In an embodiment, the second neural network is a pre-trained neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
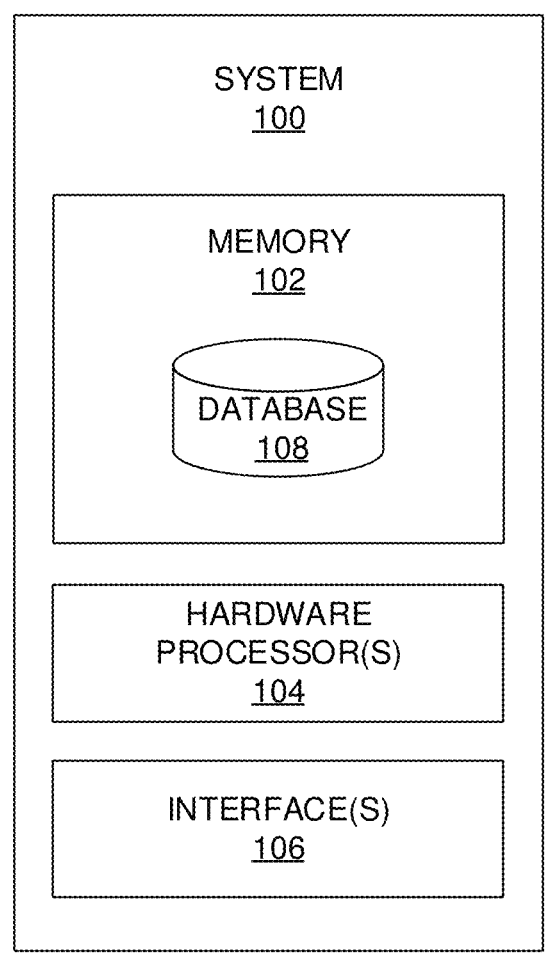
FIG. 1 illustrates an exemplary block diagram of a system for training deep neural networks to obtain compressed, sparse and trained networks, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

In deep neural network, research is porting the memory- and computation-intensive network models on embedded platforms with a minimal compromise in model accuracy. To this end, the present disclosure implements an approach, termed as Variational Student, where the benefits of compressibility of the knowledge distillation (KD) framework, and sparsity inducing abilities of variational inference (VI) techniques have been discussed.

Several approaches have been implemented in the past to model compression such as parameter pruning and sharing, low rank factorization, compact convolutional filters, and knowledge distillation (KD). The present disclosure focuses on KD, wherein the systems associated thereof implement method(s) to distil knowledge from a large, complex and neural network (e.g., possibly pre-trained teacher model) to another neural network (e.g., a small student network), by using the class distributions of teacher network for training the student network. KD based approaches are attractive since it saves on retraining effort with respect to the teacher, and still lead to a smaller and a compressed student. KD was first proposed for shallow models which was later extended to deep models. Several variants of the KD approach have been proposed to achieve improved model compression such as FitNets for wide and deep network compression for model compression in face recognition tasks, etc.

A parallel approach to achieve sparsity in DNNs is by taking the Bayesian route. Bayesian neural networks (BNN) are robust to overfitting, they learn from small datasets and offer uncertainty estimates through the parameters of per-weight probability distributions. Furthermore, Variational inference formulations can lead to clear separation between prediction accuracy and model complexity aiding in both, analysis and optimization of DNNs, thus, contributing to explainable AI methods. One of the earliest contributions in the context of Bayesian inference for neural networks is the variational dropout (VD) technique which was proposed to infer the posterior of network weights, with a goal of learning these weights jointly with the dropout rate. Several others proposed sparse variational dropout (SVD) technique where they provided an approximation of the KL-divergence term in the VD objective, and showed that this leads to sparse weight matrices in fully-connected and convolutional layers. Another approach involved variational Bayesian dropout (VBD) technique where, in addition to the prior on the weights, a hyperprior is assumed on the parameters of prior distribution. Further yet other approaches involved technique to achieve compression beyond sparsity using a fixed-point precision-based encoding of weights and taking into account the computational structure of neural networks for exploiting its structured sparsity.

Embodiments of the present disclosure consider a Binarized Neural Network (BNN) based student in a vanilla KD framework. The advantage of such an approach is twofold: the first neural network (e.g., student network) is compact as compared to the second neural network (e.g., teacher network) by the virtue of KD, and in addition, the Bayesian nature of the student allows to employ several sparsity exploiting techniques such as SVD or VBD, hence achieving a sparse student. In particular, the hint (or output generated) from the teacher network helps to retain the accuracy as achieved by the teacher, and yet obtain a compact and sparse student network. However, one question still remains: is it possible to utilize any information from the teacher network in order to induce larger degree of sparsity in the student? This technical problem is addressed by the present disclosure, by using Block Sparse Regularization (BSR) constraint on the weights of the student network relative to the weights of the teacher network.

Block sparse constraints have been employed for realizing sparse neural networks. For instance, BSR based Group-Lasso regularisation was exploited to learn sparse structures to accelerate performance in CNNs and RNNs. In the context of multi-task learning (MTL), existing approaches have introduced sparsity using group-lasso, a mixed norm variant of the form $l_1/l_q$ to learn shared set of parameters for different tasks. Moreover, BSR leads to sparse weights when related tasks have to be learnt in the MTL framework. Along the same lines, the ability of BSR to induce sparsity in the weights of student network, using the weights of the teacher network in the KD framework is explored by the present disclosure, since student and teacher networks are employed for related tasks. In other words, in the present disclosure, the systems and methods are implemented to employ BSR for inducing sparsity in the context of KD or in the Bayesian framework.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary block diagram of a system for training deep neural networks to obtain compressed, sparse and trained networks, in accordance with an embodiment of the present disclosure. The system 100 may also be referred as 'training system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise information, for example, domain information, input data pertaining to specific domain, ground truth information, weights pertaining to layers in neural networks (e.g., first (deep) neural network such as student network, a second (deep) neural network such as a teacher network), weight updation information, sparsity constraints, variational dropout parameters, cross-entropy loss function, pre-defined threshold, and the like. In an embodiment, the memory 102 may store (or stores) one or more techniques(s) (e.g., variational inference, block sparse regularization techniques, etc.) and the like. The above techniques which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to weights updation, outputs of the student and teacher networks, difference in outputs of the networks for each subset of samples from the input data, difference in output of student network and ground truth information for each subset of samples from the input data, and the like may be stored in the memory 102. In other words, input(s) fed at each step and output(s) generated at each step are comprised in the memory 102, and can be utilized in further processing and analysis.

Figure 2:
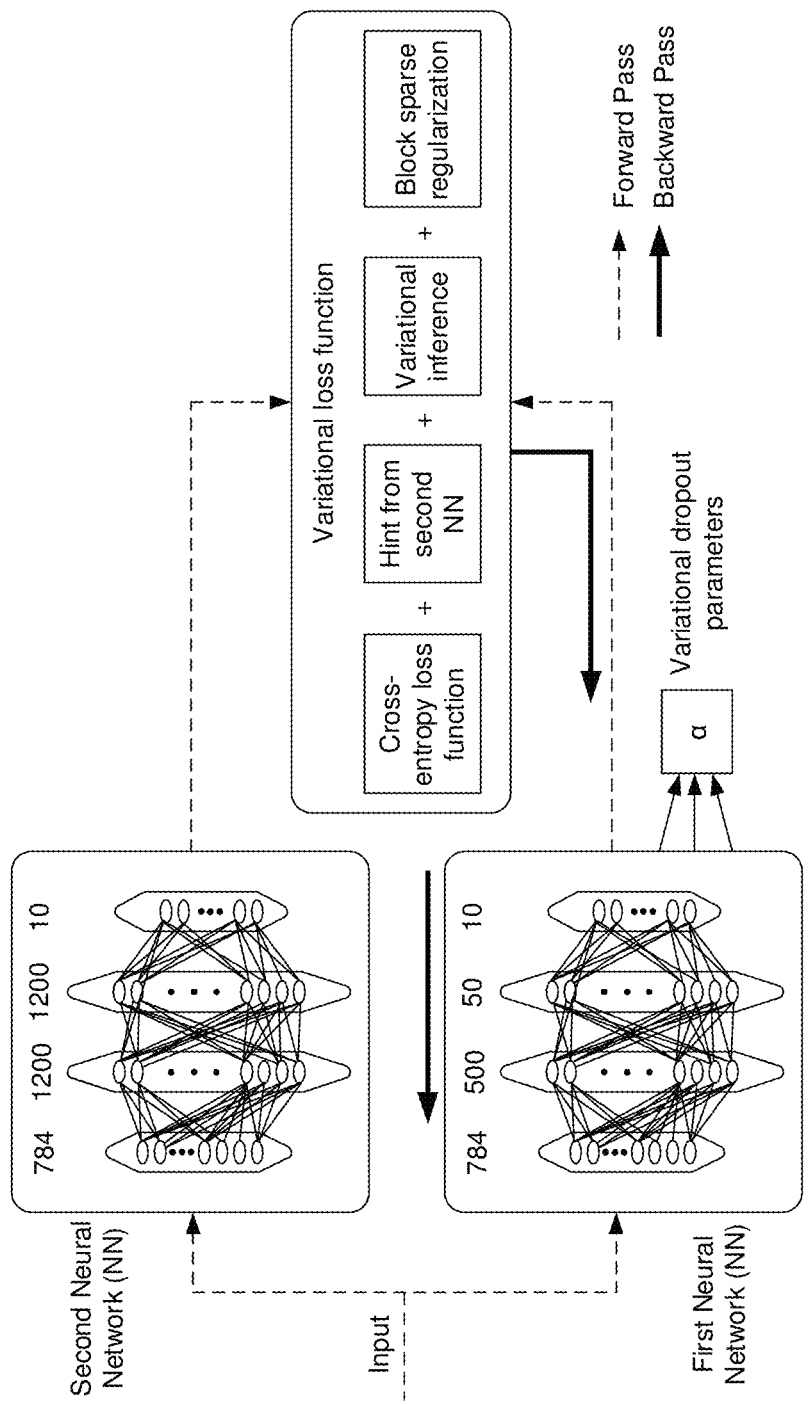
FIG. 2 illustrates an exemplary block diagram depicting training procedure for learning compact and sparse networks, in accordance with an embodiment of the present disclosure network architecture.
Figure 3:
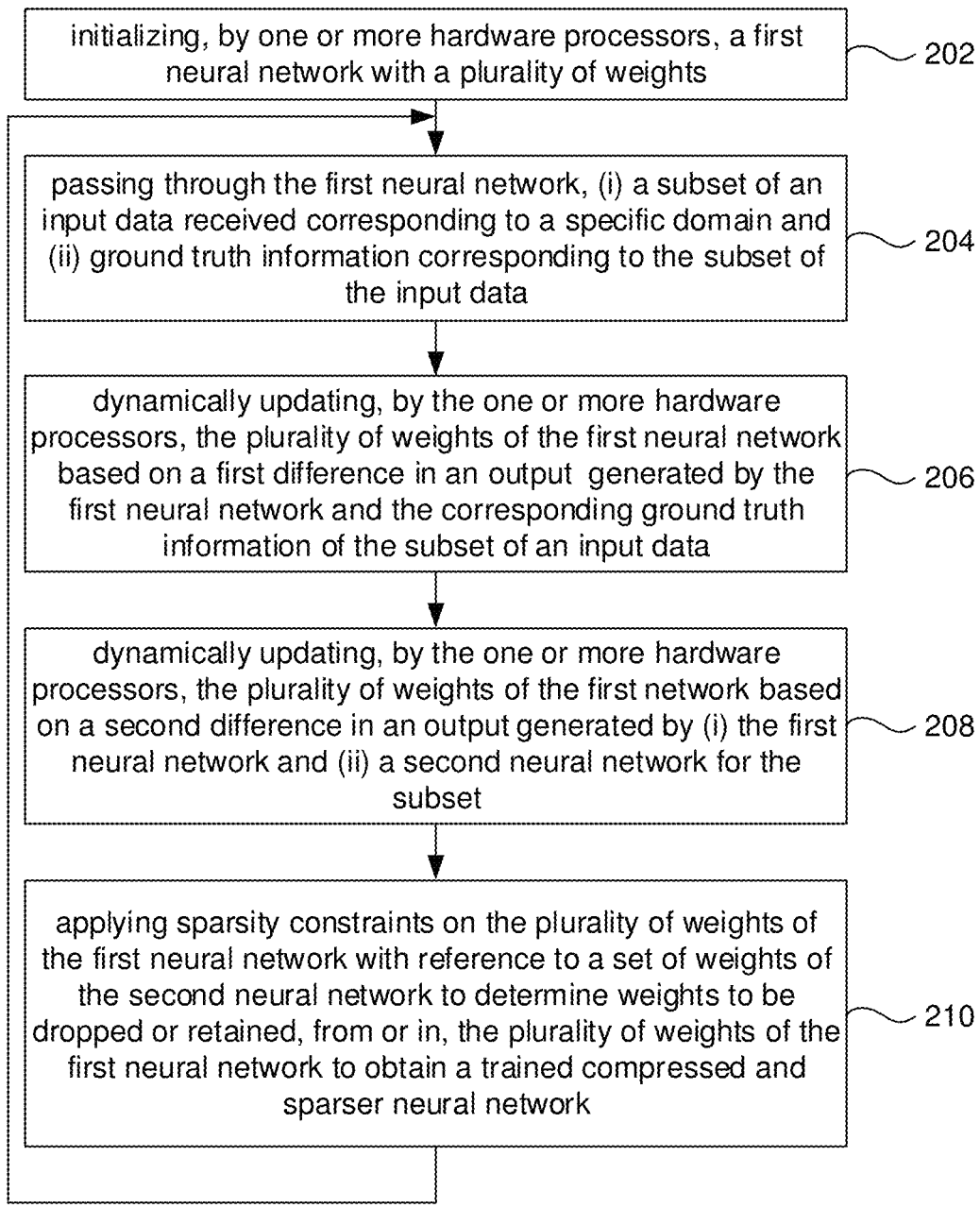
FIG. 3 is an exemplary flow diagram illustrating a method for learning compact and sparse networks, in accordance with an embodiment of the present disclosure network architecture.

FIG. 2, with reference to FIG. 1, illustrates an exemplary block diagram depicting training procedure for learning compact and sparse networks, in accordance with an embodiment of the present disclosure network architecture. FIG. 3, with reference to FIGS. 1-2, is an exemplary flow diagram illustrating a method for learning compact and sparse networks, in accordance with an embodiment of the present disclosure network architecture. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, exemplary training procedure of FIG. 2 and the flow diagram as depicted in FIG. 3. In an embodiment of the present disclosure, at step 202, the one or more hardware processors 104 initialize a first neural network with a plurality of weights. In an embodiment the first neural network is a deep neural network. In another embodiment, the first neural network is a student neural network.

The hardware processors 104 further trains the first neural network by iteratively performing steps described below. At step 202, the one or more hardware processors 104 pass through the first neural network, (i) a subset of an input data received corresponding to a specific domain and (ii) ground truth information corresponding to the subset of the input data. Likewise, a second neural network referred as 'teacher network' is also initialized wherein input data specific to a domain is passed. The expressions 'second neural network', 'second deep neural network' and 'teacher network' may be interchangeably used herein. Similarly, the expressions 'first neural network' and 'first deep neural network' and 'student network' may be interchangeably used herein. In an embodiment of the present disclosure, the teacher network is a pre-trained neural network.

Present disclosure describes the Knowledge Distillation framework and variational inference techniques used for learning sparser networks or training the student neural network. In the sequel, firstly, a dataset consisting of N samples, $\mathcal{D} = (x_n, y_n)_{n=1}^N$, on which an arbitrary neural network model is to be trained.

Knowledge Distillation:

As mentioned above, in the Knowledge distillation (KD) framework, relevant information is transferred from a complex deeper network or ensemble of networks, called teacher network(s), to a simpler shallow network, called student network. Thus during inference, a compressed network with fewer parameters is obtained with minimal compromise on accuracy. The loss function, $\mathcal{L}_{KD}$, used for training the student MLP in KD framework is as follows:

$$\mathcal{L}_{KD}(x,y,W_s,W_t) = \mathcal{L}_S(y,z^s) + \lambda_T \mathcal{L}_H(y,z^s,z^t) \; z^s = f_s(x,y; W_s), z^t = f_t(x,y; W_t) \quad (1)$$

where $x=[x_1, \ldots, x_N]$ and $y=[y_1, \ldots, y_N]$ are the inputs and their corresponding labels, respectively, and $\lambda_T$ is a Langrangian multiplier. Further, $W_s = \{W_s^{(l)}, 1 \leq l \leq L_s\}$, $W_t = \{W_t^{(l)}, 1 \leq l \leq L_t\}$, where $L_s$ and $L_t$ represent the number of layers in the student and teacher networks, respectively, and $W_t^{(l)} \in \mathbb{R} \; K_t^{(l)} \times H_t^{(l)}$, $W_s^{(l)} \in \mathbb{R} \; K_s^{(l)} \times H_s^{(l)}$ are the weight tensors of student and teacher networks, respectively. The functions, $f_s(.,.;.)$ and $f_t(.,.;.)$ represent the student and teacher models that generate the respective logits $z^s$ and $z^t$. Further, the term $\mathcal{L}_S(.,.)$ represents the loss function associated to the student and $\mathcal{L}_H(.,.,.)$ represents the hint obtained from the teacher. In an embodiment, the hint herein refers to output generated by the teacher network. In particular, the term $\mathcal{L}_H(.,.,.)$ minimizes the differences in the outputs of both the networks and helps the student to mimic the teach network.

It is to be noted that this analysis was performed on an MLP network but it can easily be extended to CNN where student and teacher network weights are 4D tensors, i.e., $W_t^{(l)} \in \mathbb{R} \; K_t^{(l)} \times H_t^{(l)} \times C_t^{(l)} \times M_t^{(l)}$ and $W_s^{(l)} \in \mathbb{R} \; K_s^{(l)} \times H_s^{(l)} \times C_s^{(l)} \times M_s^{(l)}$.

At step 206, the one or more hardware processors 104 dynamically update the plurality of weights of the first neural network based on a first difference in an output generated by the first neural network and the corresponding ground truth information of the subset of an input data. For instance, output of the first neural network is an 'n' length vector (e.g., n is the number of classes), wherein each element of which represents the probability (because sum of all elements is 1) of the input belonging to one of the n classes. Ground truth prediction is another vector of length 'n' with index corresponding to the real class of input being 1 and rest all as 0s.

At step 208, the one or more hardware processors 104 dynamically update the plurality of weights of the first network based on a second difference (e.g., another difference) in an output generated by (i) the first neural network and (ii) a second neural network for the subset. For instance, both outputs of the first neural network (e.g., student network output) and the second neural network (e.g., teacher network's output) are 'n' length vectors ('n' is the number of classes) each element of which represents the probability (because sum of all elements is 1) of the input belonging to one of the n classes. According to steps 206 and 208 outputs are generated by respective neural networks. Assuming task at hand to solve is a classification problem: therefore, output generated by both student and teacher neural networks herein may be referred as vector. The vector depicts values in the vector that indicate the probability of input belonging to a particular class, wherein the class is indicated by that number in that vector. Weights are initialized by sampling from a probability distribution (e.g., a uniform distribution as utilized by the present disclosure and its associated system and method). Then they are updated using stochastic gradient descent algorithm and/or an Adam optimizer.

As can be seen in FIG. 2, an overview of the training procedure of the first neural network (student network) is depicted. In accordance with the training technique used in the KD framework, a teacher network is first trained and its weights are stored. These weights are used for generating the required hint during student network's training. The student network is trained using loss function in (1), where $$\mathcal{L}_S(y, z^S) = -\frac{1}{N} \sum_{n=1}^{N} y_n \log(z_n^s) \quad (1)$$

$$\mathcal{L}_H(y, z^s, z^t) = \frac{1}{2T^2} D_{KL}\left(\sigma'\left(\frac{z^s}{T}\right) \middle\| \sigma'\left(\frac{z^t}{T}\right)\right) \quad (2)$$

In the above equations, y is a one hot encoding of the ground truth classes, $z^s$ and $z^t$ are the output logits from student and teacher networks respectively, as given in (1). It is to be noted that, $\mathcal{L}_S$ is the cross-entropy loss over N data samples, $D_{KL}$ represents the KL-divergence and $\sigma'(.)$ represents a softmax function. Further, T is called the temperature parameter which controls the softness of probability distribution over classes as known in the art.

At step 210, the one or more hardware processors 104 apply one or more sparsity constraints (e.g., sparsity constraints such as block sparse regularization and variational dropouts used in and by the present disclosure) by utilizing block sparse regularization and a variational dropout techniques, on the plurality of weights of the first neural network with reference to a set of weights of the second neural network to determine one or more weights to be dropped or retained, from or in, the plurality of weights of the first neural network.

Sparsity through Variational Inference:

Consider a BNN with weights W, and a prior distribution over the weights, p(W). It has been shown that training a BNN involves optimizing a variational lower bound given by:

$$\max_{\emptyset} \mathcal{L}_D(\emptyset) = D_{KL}(q_\emptyset(W) \| p(W)), \tag{4}$$

where $q_\emptyset(W)$ is an approximation of the true posterior distribution of the weights of the network and $D_{KL}(q_\emptyset(W) \| p(W))$ is the KL-divergence between the posterior and parametric distribution. The expected log-likelihood, $\mathcal{L}_D(\emptyset)$, is given by:

$$\mathcal{L}_D(\emptyset) = \Sigma_{n=1}^N \mathbb{E}_{q_\emptyset(W)}[\log(p(y_n | x_n, W))] \tag{5}$$

In other words, the difference in an output and the corresponding ground truth information of the subset of an input data is estimated using the above likelihood loss function also referred as 'cross-entropy loss function' and may be interchangeably used herein.

It is evident from the above that based on different assumptions on the prior, p(W), and approximate distribution, $q_\emptyset(W)$, it is possible to obtain different variational Bayesian formulations. Among such formulations, a sparsity promoting Bayesian inference method is the Sparse Variational Dropout (SVD) technique as known in the art. SVD assumes an improper log-scale uniform prior on the entries of the weight matrix, $W \in \mathbb{R}^{K \times H}$, and $q_\emptyset(W)$ is derived to be a conditionally Gaussian distribution. Since SVD is based on the VD technique, the corresponding BNN training involves learning the per-weight variational dropout parameter $\alpha_{k,h}$, and a parameter $\theta_{k,h}$ which parameterizes the distribution of the weight $w_{k,h}$, i.e., the variational parameters are $\emptyset_{k,h} = [\alpha_{k,h}, \theta_{k,h}], k \in \{1, \ldots, K\}, h \in \{1, \ldots, H\}$. Further, VBD is an extension of the SVD technique, maintaining a log-scale uniform prior on the entries of the weight matrix W. In addition, VBD employs a hierarchical prior on the parameters of the weights distribution which is consistent with the optimization of $\mathcal{L}_D(\emptyset)$. In the present disclosure, the student BNN is trained using the SVD and the VBD techniques, and demonstrate the relative merits and demerits of the techniques.

To enforce sparsity in the student network, the present disclosure uses both SVD and VBD formulation as a variational regularizer (VR) in the loss function. It is to be noted that the main difference in these formulations arise in the KL-divergence approximation to be used in (4). The approximation of KL-divergence term proposed for SVD is as follows:

$$D_{KL}^{SVD}(q(w_{k,h} | \theta_{k,h}, \alpha_{k,h}) \| p(w_{k,h})) \approx k_1 \sigma(k_2 + k_3 \log, \alpha_{k,h}) - 0.5 \log(1 + \alpha_{k,h}^{-1}) - k_1 \tag{6}$$

where $k_1 = 0.63576$, $k_2 = 1.87320$, and $k_3 = 1.48695$. Further, $\sigma(.)$ represents a sigmoid function, and $\theta_{k,h}$ parameterizes the probability distribution of $w_{k,h}$. In other words, another difference in an output generated by (i) the first neural network and (ii) a second neural network for the subset is estimated using the above Kullback-Leibler (KL) divergence function expressed in the above equation.

Owing to the hierarchical design of prior, VBD reduces the KL-divergence term in variational lower bound in (2) as $$D_{KL}^{VBD}(q(W) \| p(W) \gamma) = \Sigma_{k=1}^K \Sigma_{h=1}^H 0.5 \log(1 + \alpha_{k,h}^{-1}) \tag{7}$$

Incorporating the sparsity constraint through VR, loss function is obtained as:

$$\mathcal{L}(x, y, W_S, W_t, \alpha) = \mathcal{L}_S(y, z^s) + \lambda_T \mathcal{L}_H(y, z^s, z^t) + \lambda_V \mathcal{L}_{KL}(W_S, \alpha) \tag{8}$$

where $\lambda_V$ is a regularization constant of KL-divergence term and $\mathcal{L}_{KL}$, could be $D_{KL}^{SVD}$ or $D_{KL}^{VBD}$ depending on the variant of the variational dropouts that will be used.

Inducing Sparsity through Block Sparse Regularization:

The intuition behind using the BSR constraint in the modified KD framework of the present disclosure is being described below:

Consider a scenario where T models are employed to solve T distinct tasks. The i-th model $T_i$ is associated to a learnable parameter vector $P_i$, and hence, the overall parameter matrix $P = [P_1, \ldots, P_T]$, i.e., P is formed by concatenating the per-task parameter vectors $p_i$. Hence, in a typical MTL scenario, the objective is to jointly learn such a parameter matrix P. Several conventional methods assume that all models share a small set of parameters since they assume that the tasks are related. While $l_1$ norm over $p_i$ is employed in a single-task learning setup, a multi-task setting necessitates using a BSR. Furthermore, existing conventional approaches have demonstrated that BSR results in a sparse parameter matrix P when related tasks are to be learnt, i.e., related tasks tend to learn fever features than the unrelated ones.

The effectiveness of BSR in a multi-task learning (MTL) context is clearly evident, but the present disclosure explains how this idea could be applied in the scenario as being discussed herein by the systems and methods associated thereof. In the setup as implemented by the present disclosure, weights of teacher network and student network are stacked as tensors analogous to matrix P. $W_{T:S}$ is defined as the concatenation of $W_t$ and $W_s$ along the dimension of layers. BSR (one or more constraints) is/are then applied on $W_{T:S}$ and since the tasks are performed by teacher and the student models are the same, it promotes sparsity in the aggregated tensor. Since the teacher weights are fixed, one the student weights in $W_{T:S}$ vary making it more sparse with training.

Let $M = \max_i(b(W_i^{(l)}))$ and $N = \max_i(h(W_i^{(l)}))$, where b(.) and h(.) return the width and height of a weight matrix $1 \le l \le \max(L_t, L_s)$, and $i \in \{s, t\}$, i.e., $W_{T:S} \in \mathbb{R}^{M \times N \times L}$. BSR is defined as $\mathcal{R}_g(.)$ as a function of $W_{T:S}$, as:

$$\mathcal{R}_g(W_{T:S}) = \Sigma_{m=1}^M \sqrt[q]{\Sigma_{n=1}^N \Sigma_{l=1}^L (W_{T:S}(m,n,l))^q} \tag{9}$$

It is to be noted that the expression is a generic mixed norm of the form $l_1/l_q$. Specifically, a $l_1/l_\infty$ norm regulariser takes the following form:

$$\mathcal{R}_g(W_{T:S}) = \Sigma_{m=1}^M |_{n,l}^{max} W_{T:S}(m,n,l)| \tag{10}$$

Similarly in case of CNNs, $W_{T:S} \in \mathbb{R}^{M \times N \times K \times H \times L}$ is a 5D-tensor where M, N, K, H, L take the maximum size in their respective dimension. Thus, in this case $\mathcal{R}_g(W_{T:S})$ becomes:

$$\mathcal{R}_g(W_{T:S}) = \Sigma_{m=1}^M |_{n,k,h,l}^{max} W_{T:S}(m,n,k,h,l)| \tag{11}$$

The present disclosure incorporates $\mathcal{R}_g(W_{T:S})$ as a regularization term in (8) to arrive at a final loss function (also referred as 'optimization function') as given below:

$$\mathcal{L}(x, y, W_s, W_t, \alpha) = \mathcal{L}_S(y, z^s) + \lambda_T \mathcal{L}_H(y, z^s, z^t) + \lambda_V \mathcal{L}_{KL}(W_s, \alpha) + \lambda_g \mathcal{R}_g(W_{T:S}) \tag{12}$$

where $\lambda_g$ is an additional regularization constant as compared to (8). The above equation (12) depicting the final loss function is used to train the student network in the present disclosure and the method described herein. The final loss function is optimized to obtain the trained compressed and sparser neural network comprising the determined one or more weights being less than the plurality of weights in the second neural network. In an embodiment, selection of the first neural network is based on number of parameters in one or more layers in a neural network. Further, selection of the first neural network enables for compression and accuracy. The deeper the neural network increases challenge in compression. Parameters in the one or more layers of the neural network can be, for example, but are not limited to, gradient of a function, a mathematical function(s), and the like.

The sparsity and accuracy of student networks trained with $l_1/l_\infty$ and $l_1/l_2$ (group lass) regularizations are compared herein. From equation (12), it is evident that the present disclosure utilizes VR and BSR independently to induce sparsity on the weights of the student network. Intuitively, this can lead to two cases as follows:

1. VR supports pruning, BSR rejects pruning: In such a scenario, BSR retains a particular weight, $w_{k,h}$, as non-zero. However, during inference, these weights are filtered through the dropout parameter $\alpha_{k,h}$ that are learnt through VR. Hence, the weights will be pruned in spite of the weight being non-zero.

2. VR rejects pruning, BSR supports pruning: Dropout parameters permits the weight $w_{k,h}$ to be active via $\alpha_{k,h}$. However, BSR restricts this weight to be zero, thus, resulting in pruning.

The steps 204 till 210 are iteratively performed until the final loss function depicted in equation 12 converges a predefined threshold so as to obtain a trained compressed and sparser neural network (also referred as sparser and trained compressed neural network and may be interchangeably used herein). Pre-defined threshold is estimated and set using a validation loss by a technique called early stopping. Threshold value is the training loss at which validation loss starts to increase. Early stopping technique is known to those in the art.

Furthermore, the output features from the teacher network corresponding to different input samples from the dataset are pre-computed and stored for reusing. Hence, the present disclosure enables the system 100 to scale up batch sizes, resulting in decrease in training time.

Experiments and Results:

Experimental set up, evaluation criteria and the different experiments performed on different class of networks and datasets are being described herein.

Experimental Setup and Nomenclature:

The present disclosure used an 8 core Intel® Core™ i7-7820HK CPU, 32 GB memory and an Nvidia® GeForce GTX 1080 GPU machine for experiments. The models are trained using PyTorch v0.4.1. For training and evaluation of MLPs and CNNs, conventionally known datasets—MNIST and CIFAR-10 were used. Training and testing data were split in the ratios of 1:6 and 1:5 for MNIST and CIFAR-10 datasets respectively. For all experiments with MLP, Adam optimizer with a learning rate of $10^{-3}$ for 100-150 epochs was used on the MNIST dataset. For all experiments with CNN, Adam optimizer with a learning rate of $10^{-4}$ for 100-150 epochs was used on the CIFAR dataset. For tackling early pruning problem warm up techniques as known in the art were utilized by the present disclosure and prior art approach and with value of $\lambda_v$ being set. $\lambda_T=2$ and $\lambda_g=0.01$ was used in all the experiments. Throughout the present disclosure, the representation a-b-c of a network structure represents number of nodes in different layers of the network. For the MLP-based experiments, teacher T1 with structure 1200-1200 and student S1 with structure 500-50 were employed. Further, for CNN-based experiments, teacher TC1 was used which is a VGG-19 network. The student for the CNN teacher is Le-C with structure LeNet-5-Caffe. Simple refers to an independently trained network, D refers to a network trained with binary dropouts rate of 0.4, KD is trained with hint from the teacher, and ST refers to networks trained with BSR in KD framework.

Evaluation Criteria:

Model compression performance were evaluated and the networks have been compared using the following metrics: compression ratio, per-layer sparsity and memory footprint compression (space occupied in RAM). The compression ratio, $R_c$ is defined as, $$R_c = \frac{p_b}{p_{ac}},$$

where $p_b$ and $p_{ac}$ are the number of trainable parameters before and after the compression, respectively. The present disclosure also reports the sparsity induced compression ratio, $R_s$ which is defined as, $$R_s = \frac{|W|}{|W \neq 0|},$$

$|W|$ and $|W \neq 0|$ are the number of weights and the number of non-zero weights of the DNN, respectively. Further, the present disclosure also reports compression of memory footprints of different models. Since the present disclosure employs NNs for the classification task, classification performance with top-1 error (during inference) of the DNN models has also been evaluated. Inference time of different models have been measured to evaluate the computational performance.

Network Compression and Sparsification:

Results on network compression and sparsification with respect to the neural network models and datasets specified earlier are presented below.

Multi-Layered Perceptrons on MNIST: MLP was trained with the present disclosure's technique/method on the MNIST dataset. These networks were trained with random initializations without any data augmentation. To compare the sparsity exploiting performance, method of the present disclosure has been compared with conventional VD [Molchanov et al., 2017] and VBD [Liu et al., 2018] techniques as known in the art, when used with KD framework. Below Table 1 shows the comparison of compression and sparsity achieved by the method of the present disclosure as compared to the other variants in the KD framework.

TABLE 1

| Network | Test Error (in %) | Sparsity Per Layer (in %) | $\frac{|W|}{|W \neq 0|}$ |
|---|---|---|---|
| T1 | 1.59 | $\{1.06 - 0.69\} \times 10^{-4}$ | 1 |
| S1-simple | 2.21 | 0-0 | 1 |
| S1-D | 1.69 | $\{2.55 - 0\} \times 10^{-4}$ | 1 |
| S1-KD-simple | 1.78 | $\{2.55 - 0\} \times 10^{-4}$ | 1 |
| S1-KD-D | 1.88 | $\{7.65 - 0\} \times 10^{-4}$ | 1 |

TABLE 1-continued

| Network | Test Error (in %) | Sparsity Per Layer (in %) | $\frac{|W|}{|W \neq 0|}$ |
|---|---|---|---|
| S1-SVD | 1.79 | 91.29-94.24 | 11.58 |
| S1-VBD | 1.84 | 93.36-96.02 | 15.18 |
| S1-KD-SVD | 1.75 | 92.32-94.98 | 13.11 |
| S1-KD-VBD | 1.72 | 88.05-90.22 | 8.47 |
| S1-ST-SVD | 1.81 | 94.07-96.64 | 17.31 |
| S1-ST-VBD | 1.67 | 93.83-96.53 | 16.65 |

It can be observed that the methods of the present disclosure, namely ST and STB, outperforms SVD, VBD and KD variants in terms of both sparsity and accuracy. This is owing to the sparsity induced by BSR in addition to VR. It is to be noted that VBD variants outperform SVD variants in terms of sparsity in all the cases. This is due to the effectiveness of hierarchical prior of VBD over log-uniform prior used in SVD, which was restricting regularization performance of SVD [Liu et al., 2018]. Further, FIGS. 5A-5B, with reference to FIGS. 1 through 4B, illustrate a graphical representation depicting memory footprints of different student models, in accordance with an embodiment of the present disclosure. It is to be noted that ST and STB variants outperform others in terms of compression owing to the higher sparsity induced by BSR.

VGG 19 (CNN) as Teacher on CIFAR10:

Table 2 below depicts evaluation of CNNs on CIFAR dataset. Le-C family of student networks have 657, 080 parameters and thus give a compression of 212.47×* Representative of all layers of VGG19.

TABLE 2

| Network | Test Error (in %) | Sparsity Per Layer (in %) | $\frac{|W|}{|W \neq 0|}$ |
|---|---|---|---|
| TC1 | 14.21 | 0* | 1 |
| Simple | 27.32 | $\{0 - 0 - 6.4 - 0\} \times 10^{-4}$ | 1 |
| KD-Simple | 23.13 | $\{0 - 0 - 1.6 - 0\} \times 10^{-4}$ | 1 |
| KD-D | 27.20 | 0 - 0 - 0 - 0 | 1 |
| KD-SVD | 22.82 | 4.73 - 3.02 - 30.25 - 34.60 | 1.47 |
| KD-VBD | 22.69 | 2.18 - 2.55 - 34.21 - 35.62 | 1.49 |
| ST-SVD-$l_1/l_\infty$ | 22.68 | 3.13 - 2.38 - 33.61 - 35.18 | 1.48 |
| ST-SVD-$l_1/l_2$ | 22.72 | 2.07 - 2.14 - 27.75 - 33.68 | 1.37 |
| ST-VBD-$l_1/l_\infty$ | 22.71 | 2.80 - 2.30 - 31.95 - 34.80 | 1.44 |
| ST-VBD-$l_1/l_2$ | 22.60 | 2.60 - 2.32 - 31.95 - 34.80 | 1.44 |

From Table 2 it can be seen that sparsity compression is marginally enhanced in CNNs but the number of parameters are reduced by 212.47× as mentioned above. Hence, gains on memory footprints are also huge. The VGG19 teacher takes 532.52 MB of space of memory and the compressed student only takes 2.50 MB, thus, achieving a compression of ~213×. This shows the effectiveness of the compression strategy as being described by the systems and methods of the present disclosure. Owing to the teacher's hint, the sparser student variants perform better than Simple students. Moreover, the sparser student variants outperform both KD-Simple and KD-D variant due to the regularization power of both VR and BSR.

Effects of Variational Inference

Figure 4A:
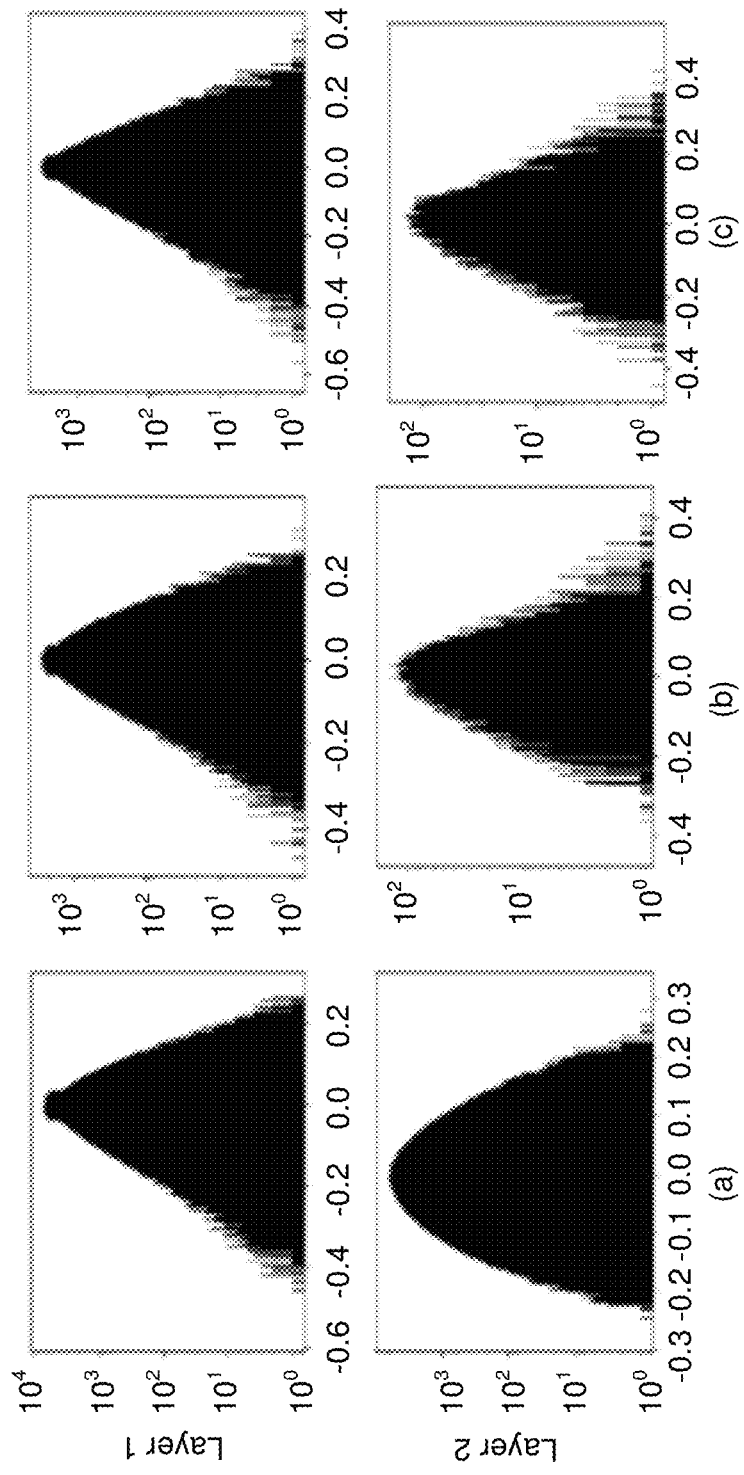
FIGS. 4A and 4B illustrate a graphical representation depicting variational inference that induces sparsity on student weight distributions, in accordance with an example embodiment of the present disclosure.
Figure 4B:
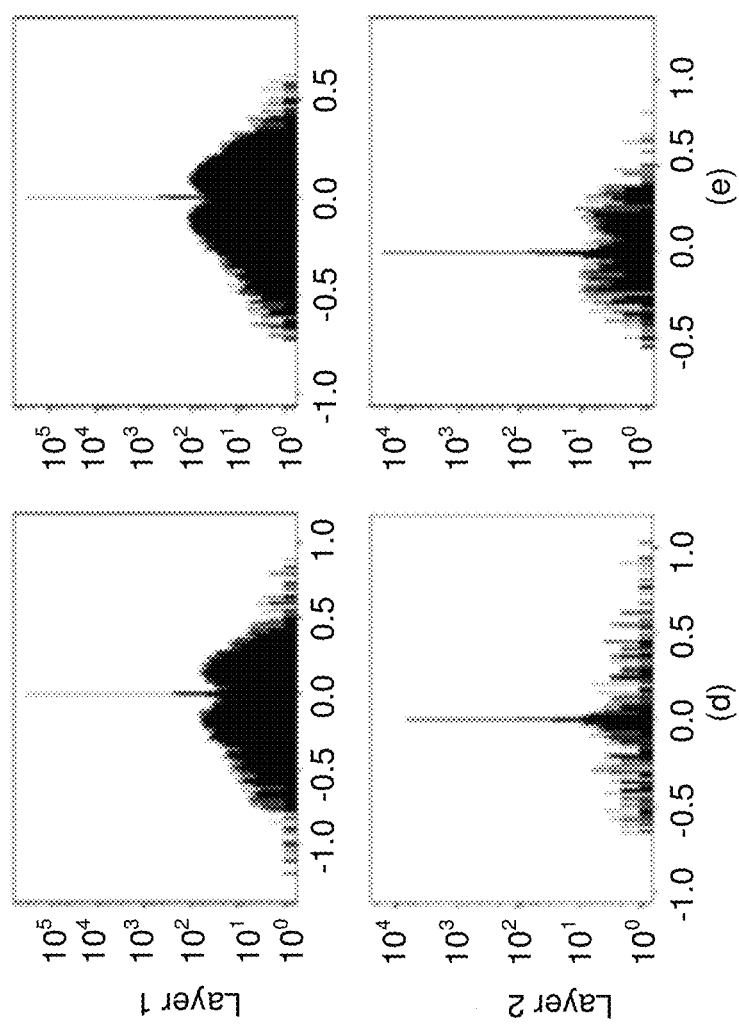
Figure 5A:
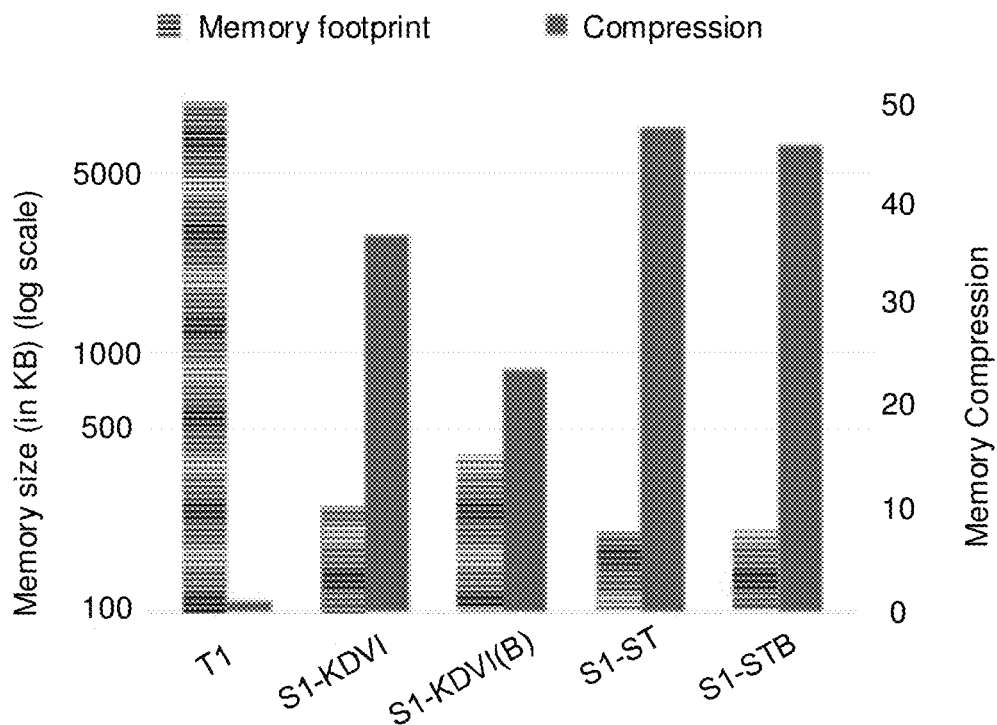
FIGS. 5A and 5B, illustrate a graphical representation depicting memory footprints of different student models, in accordance with an embodiment of the present disclosure.
Figure 5B:
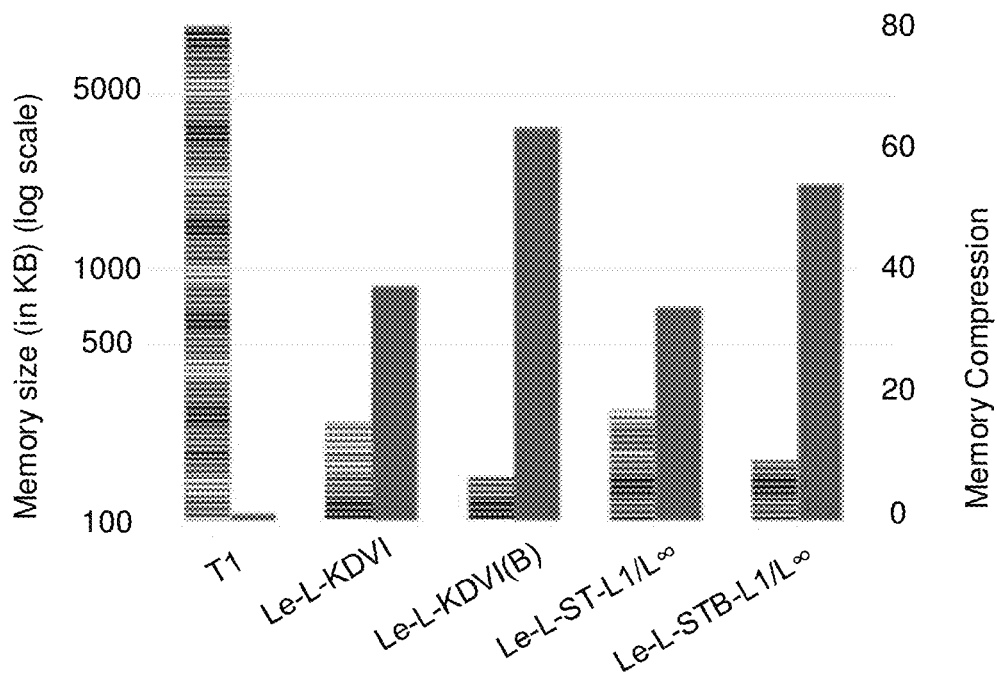

FIGS. 4A through 4B and Table 1, with reference to FIGS. 1 through 3, show that the introduction of variational methods into the KD framework induces sparsity by a factor of 8× to 17×. More specifically, FIGS. 4A through 4B, with reference to FIGS. 1 through 3, illustrate a graphical representation depicting variational inference that induces sparsity on student weight distributions, in accordance with an example embodiment of the present disclosure. FIG. 4A-4B depict the weight distribution (y-axis is in log scale) of different networks. (a), (b) of FIG. 4A depict respective weights of teacher and student networks when trained independently, (c) of FIG. 4A depicts student network trained with teacher network's hint, (d) and (e) of FIG. 4B depict variational student where SVD, VBD are applied on student network respectively and trained in a KD framework.

It is to be noted that the weights are concentrated around 0. It can be seen that when teacher and student networks are trained independently, they learn weights which are non-sparse. When student network is trained with hint from the teacher network, it learns weights with negligible increase in sparsity. As expected, a drastic increase in sparsity is obtained when SVD and VBD are applied on student network.

Effects of Block Sparse Regularization

Figure 6:
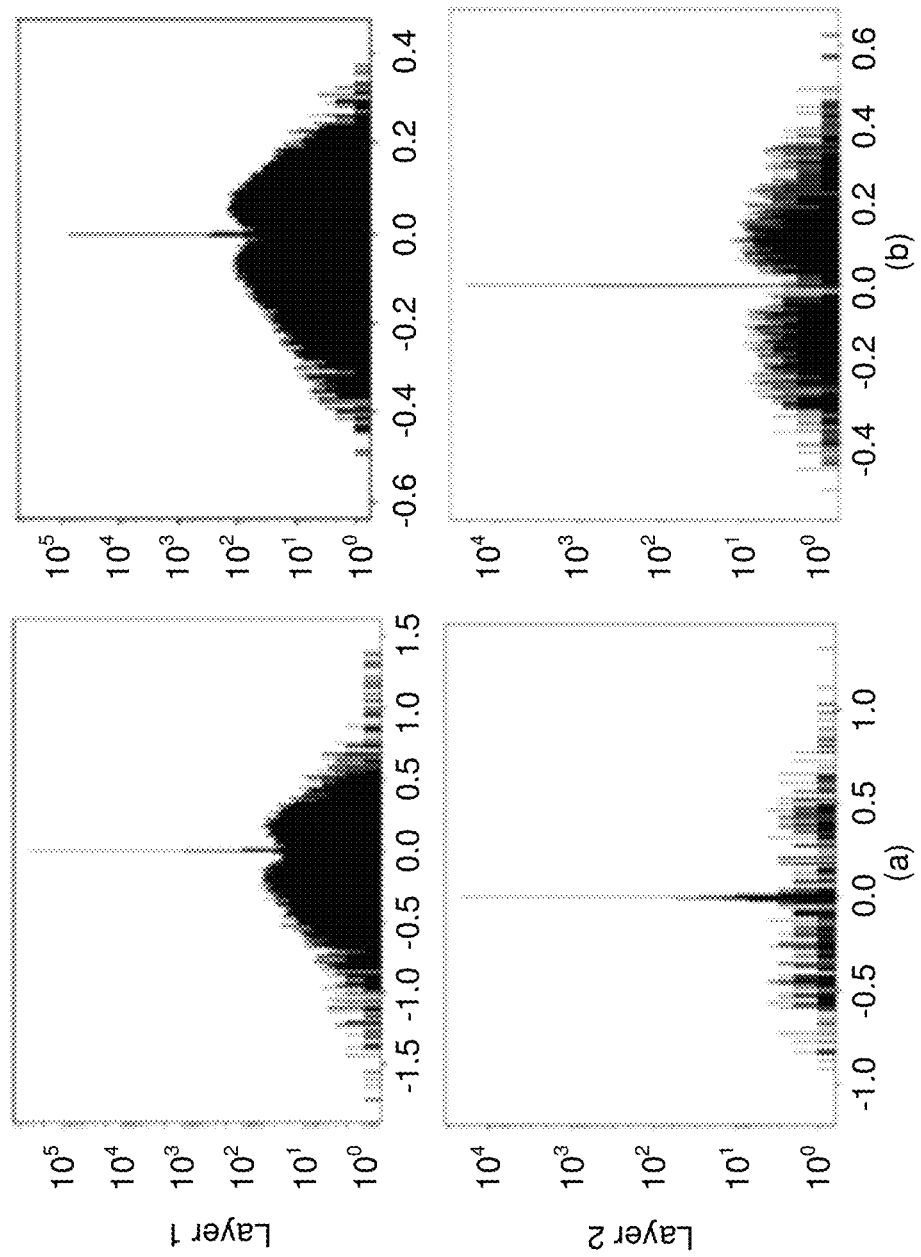
FIG. 6 illustrates a graphical representation depicting sparsity induced by Block Sparse Regularization (BSR) technique on student weight distributions, in accordance with an example embodiment of the present disclosure.
Figure 7:
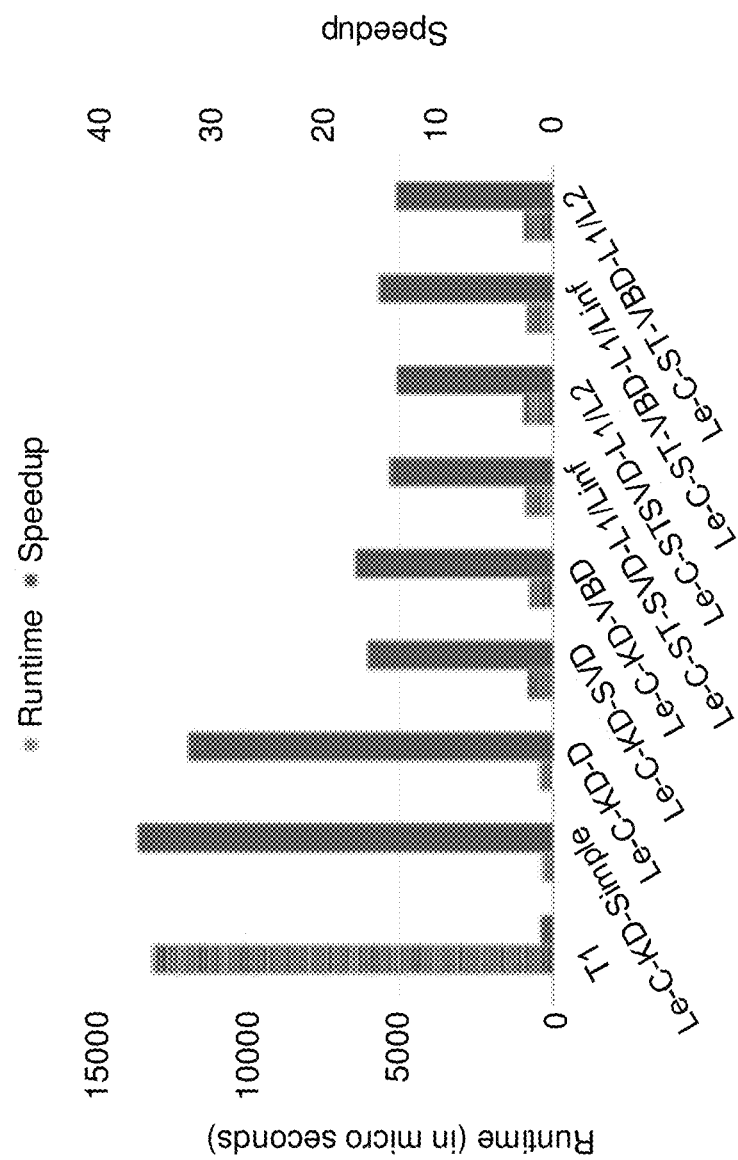
FIG. 7 illustrates a graphical representation depicting speedup of different variants of convolution networks (CNNs), in accordance with an example embodiment of the present disclosure.

Table 1 shows that applying BSR increases the sparsity with the variational techniques. However, it is not clear if this sparsity arises solely due to variational regularization over student network's weights, or due to the effect of sparsity transfer from the teacher network. From FIG. 6, it can be observed that the density of weights around 0 decreases when teacher network's weights are taken into consideration via BSR. This justifies that sparsity is induced when teacher's weight is taken into consideration. More specifically, FIG. 6, with reference to FIGS. 1 through 5B, illustrates a graphical representation depicting sparsity induced by Block Sparse Regularization (BSR) technique on student weight distributions, in accordance with an example embodiment of the present disclosure. FIG. 6 shows resultant weight distribution (y-axis is in log scale) of a student MLP when (a) BSR applied on a composite tensor consisting of weights from both student and teacher networks and (b) BSR applied only on student's weights. It is to be noted that the weights are concentrated around 0.

Runtime Analysis

It is to be noted that the inference time of teacher MLP to be 0.29 milliseconds and the student variants have inference time in the range 0.257-0.470 milliseconds. It was observed that for MLPs the variational student and BSR variants have similar inference times. Although both the variants have different computations to perform during training, but during inference they have same operations owing to similar student structures. It is further noticed that simple variants have lesser inference time compared to other variants as they avoid additional computation involving thresholding operation on α and multiplying the resultant mask with the weights. Similar trends for CNNs can be seen as well in FIG. 7. In particular, FIG. 7, with reference to FIGS. 1 through 6, illustrates a graphical representation depicting speedup of different variants of convolutional neural networks (CNNs), in accordance with an example embodiment of the present disclosure.

Present disclosure introduces Variational Student that sparsifies the neural network through a combination of Variational inference and Block Sparse regularization techniques in a KD framework. The present disclosure also demonstrates compression of the memory footprints of MLPs and CNNs by factors of 64 and 213, with minimal increase in test error. Based on the experimental results and evaluation, the present disclosure observes that Bayesian methods such as Variational Bayesian dropout and Sparse Variational Drop techniques when employed in the student architecture in the KD framework contribute to compression and hence speed-up. Further, the present disclosure also demonstrated that by bringing KD and the VI techniques together inherits compression properties from the KD framework, and enhances levels of sparsity from the VI approach, with minimal or no compromise in the model accuracy. Results on MLPs and CNNs have been experimental demonstrated in above tables (Table 1 and Table 2) and graphical representations depicted in FIGS. 4A through 7, and illustrate a memory footprint reduction of ~64× and ~213× on MLPs and CNNs, respectively, without a need to retrain the teacher network. The technique(s) or methods as implemented by the present disclosure could be applied to Feed forward neural network architectures such as Multi-Layered Perceptrons and Convolutional Neural networks. Typically, in existing conventional systems and methods, SVD and VBD are proposed as a fully Bayesian training procedure of neural networks. With the help of the embodiments of the present disclosure, the method of the present disclosure can be implemented for a semi-Bayesian technique of training neural networks.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    initializing, by one or more hardware processors, a first neural network with a plurality of weights; and
    training, by the one or more hardware processors, the first neural network by iteratively performing until a final loss function converges within a predefined threshold to obtain a trained compressed and sparser neural network:
        passing through the first neural network, (i) a subset of an input data received corresponding to a specific domain and (ii) ground truth information corresponding to the subset of the input data;
        dynamically updating, by the one or more hardware processors, the plurality of weights of the first neural network based on a first difference in an output generated by the first neural network and the corresponding ground truth information of the subset of an input data;
        dynamically updating, by the one or more hardware processors, the plurality of weights of the first network based on a second difference in an output generated by (i) the first neural network and (ii) a second neural network for the subset; and
        applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network.

2. The processor implemented method of claim 1, wherein the first difference in an output and the corresponding ground truth information of the subset of an input data is estimated using a cross-entropy loss function.

3. The processor implemented method of claim 1, wherein the second difference in an output generated by (i) the first neural network and (ii) a second neural network for the subset is estimated using a Kullback-Leibler (KL) divergence function.

4. The processor implemented method of claim 1, wherein the one or more weights to be dropped or retained are determined by solving the final loss function.

5. The processor implemented method of claim 1, wherein the final loss function is optimized to obtain the trained compressed and sparser neural network comprising the determined one or more weights being less than the plurality of weights in the second neural network, and wherein selection of the first neural network is based on number of parameters in one or more layers in a neural network.

6. The processor implemented method of claim 1, wherein the second neural network is a pre-trained neural network.

7. A system, comprising:
a memory storing instructions;
one or more communication interfaces; and
one or more hardware processors coupled to the memory via the one or more communication interfaces, wherein the one or more hardware processors are configured by the instructions to:
initialize a first neural network with a plurality of weights, wherein the first neural network is comprised in the memory and executed by the one or more hardware processors; and
train the first neural network by iteratively performing until a final loss function converges within a predefined threshold to obtain a trained compressed and sparser neural network:
passing through the first neural network, (i) a subset of an input data received corresponding to a specific domain and (ii) ground truth information corresponding to the subset of the input data;
dynamically updating the plurality of weights of the first neural network based on a first difference in an output generated by the first neural network and the corresponding ground truth information of the subset of an input data;
dynamically updating the plurality of weights of the first network based on a second difference in an output generated by (i) the first neural network and (ii) a second neural network for the subset, wherein the second neural network is comprised in the memory and executed by the one or more hardware processors; and
applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network.

8. The system of claim 7, wherein the first difference in an output and the corresponding ground truth information of the subset of an input data is estimated using a cross-entropy loss function.

9. The system of claim 7, wherein the second difference in an output generated by (i) the first neural network and (ii) a second neural network for the subset is estimated using a Kullback-Leibler (KL) divergence function.

10. The system of claim 7, wherein the one or more weights to be dropped or retained are determined by solving the final loss function.

11. The system of claim 7, wherein the final loss function is optimized to obtain the trained compressed and sparser neural network comprising the determined one or more weights being less than the plurality of weights in the second neural network, and wherein selection of the first neural network is based on number of parameters in one or more layers in a neural network.

12. The system of claim 7, wherein the second neural network is a pre-trained neural network.

13. One or more non-transitory machine readable information storage media storing instructions which, when executed by one or more hardware processors, cause the one or more hardware processors to perform a method comprising:
initializing, by the one or more hardware processors, a first neural network with a plurality of weights; and
training, by the one or more hardware processors, the first neural network by iteratively performing until a final loss function converges within a predefined threshold to obtain a trained compressed and sparser neural network:
passing through the first neural network, (i) a subset of an input data received corresponding to a specific domain and (ii) ground truth information corresponding to the subset of the input data;
dynamically updating, by the one or more hardware processors, the plurality of weights of the first neural network based on a first difference in an output generated by the first neural network and the corresponding ground truth information of the subset of an input data;
dynamically updating, by the one or more hardware processors, the plurality of weights of the first network based on a second difference in an output generated by (i) the first neural network and (ii) a second neural network for the subset; and
applying, by the one or more hardware processors, one or more sparsity constraints by utilizing block sparse regularization and a variational dropout techniques, on the plurality of weights of the first neural network with reference to a set of weights of the second neural network to determine one or more weights to be dropped or retained, from or in, the plurality of weights of the first neural network.

14. The one or more non-transitory machine readable information storage media of claim 13, wherein the first difference in an output and the corresponding ground truth information of the subset of an input data is estimated using a cross-entropy loss function.

15. The one or more non-transitory machine readable information storage media of claim 13, wherein the second difference in an output generated by (i) the first neural network and (ii) a second neural network for the subset is estimated using a Kullback-Leibler (KL) divergence function.

16. The one or more non-transitory machine readable information storage media of claim 13, wherein the one or more weights to be dropped or retained are determined by solving the final loss function.

17. The one or more non-transitory machine readable information storage media of claim 13, wherein the final loss function is optimized to obtain the trained compressed and sparser neural network comprising the determined one or more weights being less than the plurality of weights in the second neural network, and wherein selection of the first neural network is based on number of parameters in one or more layers in a neural network.

18. The one or more non-transitory machine readable information storage media of claim 13, wherein the second neural network is a pre-trained neural network.

\* \* \* \* \*